United States Patent [19]

Melito

[11] Patent Number: 5,690,511

[45] Date of Patent: Nov. 25, 1997

[54] RECONFIGURED CABLE AND PLUG ASSEMBLY AND METHOD FOR INTERCONNECTION OF TELEPHONE CONTROL BOX AND WIRE TERMINAL BLOCK

[76] Inventor: Chris John Melito, 3016 S. Oakland Forest Dr., Apt. No. 2906, Fort Lauderdale, Fla. 33309

[21] Appl. No.: 619,142

[22] Filed: Mar. 25, 1996

[51] Int. Cl.$^6$ .................................. H01R 11/00
[52] U.S. Cl. .................. 439/502; 439/623; 379/438
[58] Field of Search .......................... 439/502, 709, 439/719, 49, 623; 379/438

[56] References Cited

U.S. PATENT DOCUMENTS

| | | | |
|---|---|---|---|
| 4,131,330 | 12/1978 | Stupany | 439/49 |
| 4,179,170 | 12/1979 | Splitt et al. | 439/49 |
| 4,712,232 | 12/1987 | Rodgers | 439/719 |

*Primary Examiner*—Neil Abrams
*Assistant Examiner*—T. C. Patel
*Attorney, Agent, or Firm*—Robert J. Van Der Wall

[57] ABSTRACT

A reconfigured standard telephone cable assembly for connecting cable plug receptacles on a generic control box to a telephone terminal block includes a standard telephone cable containing several lead wires within a cable casing, each lead wire having a plug end and a block end and a distinctive color code corresponding to an established color code sequence; a first cable plug and a second cable plug, each cable plug having a connection structure for connecting several lead wires, where the first eight of the lead wire plug ends in the cable code sequence are connected to the connection structure of the first cable plug, and where the second eight of the lead wire plug ends in the cable code sequence are connected to the connection structure of the second cable plug. The assembly preferably additionally includes a third cable plug. A method of making the assembly includes the steps of providing a standard telephone cable containing several lead wires within a cable casing, each lead wire having a plug end and a block end and a distinctive color code corresponding to an established color code sequence and a first plug having a connection structure connected to the lead wire plug ends; opening the cable casing adjacent to the lead wire plug ends; providing a second cable plug disconnecting several the lead wire ends, connecting the ninth through the sixteenth lead wires to the connection structure of the second cable plug.

6 Claims, 6 Drawing Sheets

| PAIR | COLOR | FUNCTION | |
|---|---|---|---|
| 1T | WH-BL | CARD #1 | PORT #1 |
| 1R | BL-WH | | |
| 2T | WH-OR | CARD #1 | PORT #2 |
| 2R | GR-WH | | |
| 3T | WH-GN | CARD #1 | PORT #3 |
| 3R | GR-WH | | |
| 4T | WH-BR | CARD #1 | PORT #4 |
| 4R | BR-WH | | |
| 5T | WH-SL | CARD #1 | PORT #5 |
| 5R | SL-WH | | |
| 6T | RD-BL | CARD #1 | PORT #6 |
| 6R | BL-RD | | |
| 7T | RD-OR | CARD #1 | PORT #7 |
| 7R | OR-RD | | |
| 8T | RD-GR | CARD #1 | PORT #8 |
| 8R | GR-RD | | |
| 9T | RD-BR | CARD #2 | PORT #1 |
| 9R | BR-RD | | |
| 10T | RD-SL | CARD #2 | PORT #2 |
| 10R | SL-RD | | |
| 11T | BK-BL | CARD #2 | PORT #3 |
| 11R | BL-BK | | |
| 12T | BK-OR | CARD #2 | PORT #4 |
| 12R | OR-BK | | |
| 13T | BK-GR | CARD #2 | PORT #5 |
| 13R | GR-BK | | |
| 14T | BK-BR | CARD #2 | PORT #6 |
| 14R | BR-BK | | |
| 15T | BK-SL | CARD #2 | PORT #7 |
| 15R | SL-BK | | |
| 16T | YL-BL | CARD #2 | PORT #8 |
| 16R | BL-YL | | |
| 17T | YL-OR | CARD #3 | PORT #1 |
| 17R | OR-YL | | |
| 18T | YL-GR | CARD #3 | PORT #2 |
| 18R | GR-YL | | |
| 19T | YL-BR | CARD #3 | PORT #3 |
| 19R | BR-YL | | |
| 20T | YL-SL | CARD #3 | PORT #4 |
| 20R | SL-YL | | |
| 21T | VI-BL | CARD #3 | PORT #5 |
| 21R | BL-VI | | |
| 22T | VI-OR | CARD #3 | PORT #6 |
| 22R | OR-VI | | |
| 23T | VI-GN | CARD #3 | PORT #7 |
| 23R | GN-VI | | |
| 24T | VI-BR | CARD #3 | PORT #8 |
| 24R | BR-VI | | |
| 25T | VI-SL | NOT USED | |
| 25R | SL-VI | | |

| PAIR | COLOR | FUNCTION |
|---|---|---|
| 1T / 1R | WH-BL / BL-WH | PORT 00 DIGITAL |
| 2T / 2R | WH-OR / OR-WH | PORT 01 DIGITAL |
| 3T / 3R | WH-GN / GR-WH | PORT 02 DIGITAL |
| 4T / 4R | WH-BR / BR-WH | PORT 03 DIGITAL |
| 5T / 5R | WH-SL / SL-WH | PORT 04 DIGITAL |
| 6T / 6R | RD-BL / BL-RD | PORT 05 DIGITAL |
| 7T / 7R | RD-OR / OR-RD | PORT 06 DIGITAL |
| 8T / 8R | RD-GR / GR-RD | PORT 07 DIGITAL |
| 9T / 9R | RD-BR / BR-RD | NOT USED |
| 10T / 10R | RD-SL / SL-RD | PORT 08 ANALOG |
| 11T / 11R | BK-BL / BL-BK | PORT 09 ANALOG |
| 12T / 12R | BK-OR / OR-BK | PORT 10 ANALOG |
| 13T / 13R | BK-GR / GR-BK | PORT 11 ANALOG |
| 14T / 14R | BK-BR / BR-BK | NOT USED |
| 15T / 15R | BK-SL / SL-BK | NOT USED |
| 16T / 16R | YL-BL / BL-YL | CENTRAL OFFICE LINE #1 |
| 17T / 17R | YL-OR / OR-YL | CENTRAL OFFICE LINE #2 |
| 18T / 18R | YL-GR / GR-YL | CENTRAL OFFICE LINE #3 |
| 19T / 19R | YL-BR / BR-YL | CENTRAL OFFICE LINE #4 |
| 20T / 20R | YL-SL / SL-YL | POWER FAIL TELEPHONE |
| 21T / 21R | VI-BL / BL-VI | NOT USED |
| 22T / 22R | VI-OR / OR-VI | NOT USED |
| 23T / 23R | VI-GN / GN-VI | RELAY CONTACT |
| 24T / 24R | VI-BR / BR-VI | MUSIC ON HOLD |
| 25T / 25R | VI-SL / SL-VI | PAGING OUTPUT |

RECONFIGURED CABLE AND PLUG ASSEMBLY AND METHOD FOR INTERCONNECTION OF TELEPHONE CONTROL BOX AND WIRE TERMINAL BLOCK

BACKGROUND OF THE INVENTION

1. Field of the Invention

The present invention relates generally to the field of communication systems. More specifically the present invention relates to a standard analog telephone cable and plug assembly which is reconfigured for a digital telephone system to provide improved space and hardware efficiency.

The present invention reconfigures the standard cable to use virtually all of the lead wires in the cable and all of the terminals in a block, so that fewer cables and blocks are needed. More importantly, installation time is greatly reduced, because very little time is spent connecting dead wires to blocks. Embodiments of the invention are provided for both the generic and the TOSHIBA™ control boxes.

The first embodiment of the present invention is for use with the generic three plug receptacle control box. The cable apparatus is created from a 25 pair AMP™ tail standard cable and plug. One cable plug is already connected to the cable. The outer casing at the plug end of the cable is opened. The first eight pairs in the code sequence remain connected to this first cable plug, and the remaining wire pairs are disconnected. The second eight wire pairs in the code sequence are connected in color code order to terminals of a second cable plug, and the third eight wire pairs are connected in color code order to terminals of a third cable plug. These three cable plugs can then be fitted into the three receptacles in the generic control box, so that all telephone lines for the box run through the one cable. Twenty four of the twenty five wire pairs in the single cable are thereby used. The wire pairs are connected in color code order to terminals of a single block, rather than to the first eight terminals of each of three separate blocks. Three sets of eight wire pairs are run from the one block to individual telephones.

The second embodiment is for use with the TOSHIBA™ control box, and is also fashioned from a standard cable and plug. For TOSHIBA™ digital systems, only the first eight wire pairs of the cable are used for multi-line digital telephones. The ninth wire pair is unused and the wire pairs ten through thirteen in the sequence are used for analog single lines such as for home telephones, modems and for telefax machines. Yet, once again, all twenty-five wire pairs, including the unused thirteen, must be punched down onto the block in coded order, according to Fire Marshall rules. The five modular receptacles on the TOSHIBA™ control box each provide a separate telephone number. These separate numbers work in conjunction with the first eight separate lines, so that each line can have up to five numbers, as seen on many office telephones. Separate modular plugs are fitted into the five modular receptacles at one end and into modular jacks at the other end. TOSHIBA™ provides two speaker plug receptacles, and one speaker plug receptacle is connected with a speaker plug wire, often referred to as RCA™ plugs, to a radio system, which may provide music to telephone lines on hold, or to speakers in the building ceiling. The other speaker plug receptacle may be connected to a paging system.

To make the second embodiment, the outer casing of the plug end of the cable, to which the one AMP™ tail plug is already fitted, is opened. The first eight wire pairs in the code sequence remain connected to the existing plug, and the remaining wire pairs are disconnected. Five of the remaining wire pairs are each connected to a modular plug. Two of the remaining wire pairs are each connected to a speaker plug.

As a result, the single cable has one AMP™ tail plug which is fitted into the TOSHIBA™ tail plug receptacle, five modular plugs which are fitted into the five modular receptacles, and two speaker plugs which are fitted into the two speaker plug receptacles. Rather than being wired through a modular jack, the five modular phone number lines connect to the telephone wires through the same block to which the eight line wire pairs are connected. Once again these wires are punched onto the block in the established color code sequence. The two speaker plug wire pairs connect to radio and paging systems through the same block. An additional wire pair is connected through the block to a relay contact for unlocking a building outside door.

This inventive single cable system utilizes nineteen of the twenty five wire pairs in the standard cable. It eliminates the need for additionally installing and connecting five modular phone jacks and two separate speaker plug lines.

2. Description of the Prior Art

In modern buildings, telephone lines are brought into wiring rooms, known as telephone closets, where they connect to control boxes. The lines in turn are brought from the control boxes to individual telephones through standard cable and plug assemblies mounted onto what are known as terminal blocks. Each cable contains twenty five pairs of individually insulated lead wires, and a single twenty five contact plug, known as an AMP™ tail plug, is provided on the control box end of the cable which is fitted into a receptacle on the control box. Most control boxes have receptacles for three separate AMP™ tail plugs, while the TOSHIBA™ control box has only one AMP™ tail plug receptacle combined with five modular jacks and two speaker plug jacks. The outer casing at the block end of the cable is open to expose the pairs of lead wires, and the lead wire free ends are individually punched into a series of terminals on a block. The lead wires are color coded so that they can be connected to the block terminals in a specific order according to a color coded standard established by the industry. Each block terminal includes a pair of closely spaced tines with opposing sharp edges and a lead wire is fit tightly between the tines so that the sharp edges cut through the wire insulation and make electrical contact. Opposite each in-coming lead wire block terminal is a corresponding out-going terminal into which is connected an outgoing telephone wire, running to an individual telephone. A conductive bridge is placed across each pair of corresponding in-coming and out-going terminals which carry a telephone line. No such bridges are provided for telefax and modem lines.

These standard AMP™ tail cables and blocks were designed for the now obsolete analog telephones. Analog telephones require six lead wire pairs for each telephone line. Each such line can carry several numbers, which are indicated on the faces of standard office telephones. Thus these twenty five pair standard cables could carry up to four analog lines.

The old analog systems are progressively being replaced with digital telephone systems. Digital telephone lines also carry several numbers and yet each require only one pair of lead wires. As a result, for a generic control box only the first eight lead wires in the color code sequence in a cable are used for digital telephone lines. The remaining seventeen wire pairs are simply dead wires serving no purpose. Since a standard control box has three cable plug receptacles, three such generic cables, each having seventeen dead wires, run to three blocks, each block having seventeen dead terminals. The Fire Marshall generally requires that no wires be left unconnected, and the installer must therefore spend the substantial time necessary to connect each of the dead wires in sequence to the remaining terminals on the block. This practice of re-wiring the old analog cables and blocks for digital systems is highly inefficient in space usage because less than one third of the wiring and contacts of each of the multiple cables and blocks is operational. More importantly, this practice wastes substantial numbers of worker hours and creates a needlessly complex and confusing assembly.

It is thus an object of the present invention to provide a reconfigured analog cable and block structure which makes efficient use of virtually all lead wires and block terminals, and which thereby reduces the number of cables and blocks making up a digital telephone system.

It is another object of the present invention to provide such a structure which can be constructed entirely of existing standard analog cable, AMP™ tail plugs and blocks so that no different hardware need be molded or extruded.

It is still another object of the present invention to provide such a structure which can be installed with fewer worker hours than the present converted analog digital system.

It is finally an object of the present invention to provide such a structure which is easy for one skilled in the art of the present digital configurations to understand, install and service.

SUMMARY OF THE INVENTION

The present invention accomplishes the above-stated objectives, as well as others, as may be determined by a fair reading and interpretation of the entire specification.

A reconfigured standard telephone cable assembly is provided for connecting cable plug receptacles on a generic control box to a telephone terminal block, including a standard telephone cable containing several lead wires within a cable casing, each lead wire having a plug end and a block end and a distinctive color code corresponding to an established color code sequence; a first cable plug and a second cable plug, each cable plug having a connection structure for connecting several lead wires, where the first eight of the lead wire plug ends in the cable code sequence are connected to the connection structure of the first cable plug, and where the second eight of the lead wire plug ends in the cable code sequence are connected to the connection structure of the second cable plug. The assembly preferably additionally includes a third cable plug, where a third eight of the lead wire plug ends in the color code sequence are connected to the connection structure of the third cable plug.

A reconfigured standard telephone cable assembly is provided, including a generic control box having several cable plug receptacles; a telephone terminal block; and a standard telephone cable containing several lead wires within a cable casing, each lead wire having a plug end and a block end and a distinctive color code corresponding to an established color code sequence; and a first cable plug and a second cable plug, each cable plug having a connection structure for connecting several lead wires, where the first eight of the lead wire plug ends in the code sequence are connected to the connection structure of the first cable plug, and where a second eight of the lead wire plug ends in the code sequence are connected to the connection structure of the second cable plug. The assembly preferably additionally includes a third cable plug, where a third eight of the lead wire plug ends in the color code sequence are connected to the connection structure of the third cable plug.

A method is provided of making a reconfigured telephone cable plug assembly, including the steps of providing a standard telephone cable containing several lead wires within a cable casing, each lead wire having a plug end and a block end and a distinctive color code corresponding to an established color code sequence and a first plug having a connection structure connected to the lead wire plug ends; opening the cable casing adjacent to the lead wire plug ends; disconnecting several the lead wire ends, beginning with the ninth lead wire in the color code sequence; providing a second cable plug having lead wire connection structure; and connecting the ninth through the sixteenth lead wires in the color code sequence to the connection structure of the second cable plug. The method preferably additionally includes the steps of providing a telephone control box having several cable plug receptacles; plugging the first cable plug and the second cable plug into the cable plug receptacles; providing a terminal block having several terminals; and connecting the lead wires to terminals on the telephone terminal block in the color code sequence.

A reconfigured standard telephone cable is provided for connecting plug receptacle terminals on a TOSHIBA™ control box to a telephone terminal block, including a standard telephone cable containing several lead wires within a cable casing, each lead wire having a plug end and a block end and a distinctive color code corresponding to an established color code sequence; and a first cable plug having a connection structure for connecting several lead wires, where the first eight of the lead wire plug ends in the code sequence are connected to the connection structure of the first cable plug, and a modular plug where one of the remaining lead wires is connected to the modular plug, and a speaker plug where one of the remaining lead wires is connected to the speaker plug.

A reconfigured standard telephone cable assembly is provided, including a TOSHIBA™ control box having a cable plug receptacle and a modular plug jack and a speaker plug jack; a telephone terminal block; a standard telephone cable containing several lead wires within a cable casing, each lead wire having a plug end and a block end and a distinctive color code corresponding to an established color code sequence; and a first cable plug having a connection structure for connecting several lead wires, where the first eight of the lead wire plug ends in the code sequence are connected to the connection structures of the first cable plug, and a modular plug where one of the remaining the lead wires is connected to the modular plug, and a speaker plug where another one of the remaining lead wires is connected to the speaker plug.

A method is provided of making a reconfigured telephone cable plug assembly for use with a TOSHIBA™ telephone control box and a terminal block, including the steps of providing a standard telephone cable containing several lead wires within a cable casing, each lead wire having a plug end and a block end and a distinctive color code corresponding to an established color code sequence and a first plug having a connection structure connected to the lead wire plug ends; opening the cable casing adjacent to the lead wire plug ends; disconnecting several lead wire ends beginning with the ninth in the color code sequence; providing a modular plug having a connection structure; providing a speaker plug having a connection structure; connecting one of the disconnected lead wires to the modular plug; and connecting one of the disconnected lead wires to the speaker plug. The method preferably additionally includes the steps of providing a telephone control box having a cable plug receptacle and a modular plug receptacle and a speaker plug receptacle; plugging the cable plug and the modular plug and the speaker plug into the plug receptacles; providing a telephone terminal block having several terminals; and connecting the lead wires to terminals on the telephone terminal block in the color code sequence.

BRIEF DESCRIPTION OF THE DRAWINGS

Various other objects, advantages, and features of the invention will become apparent to those skilled in the art from the following discussion taken in conjunction with the following drawings, in which:

Prior Art

Prior Art

FIG. 5 is a schematic representation of a block wired with the first embodiment reconfigured cable.

Prior Art

Prior Art

FIG. 10 is a schematic representation of a block wired with the second embodiment TOSHIBA™ reconfigured cable.

DETAILED DESCRIPTION OF THE PREFERRED EMBODIMENTS

Figure 1:
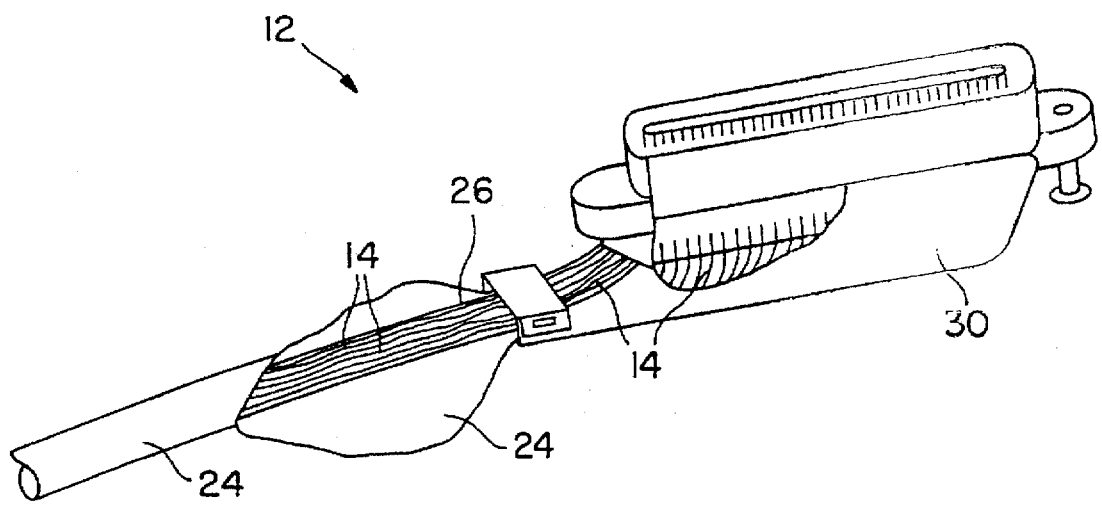
FIG. 1 is a perspective view of a conventional standard cable for connecting a generic telephone control box to a block, with a portion of the cable outer casing and plug shell cut away to reveal lead wire connections to the AMP™ tail plug.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
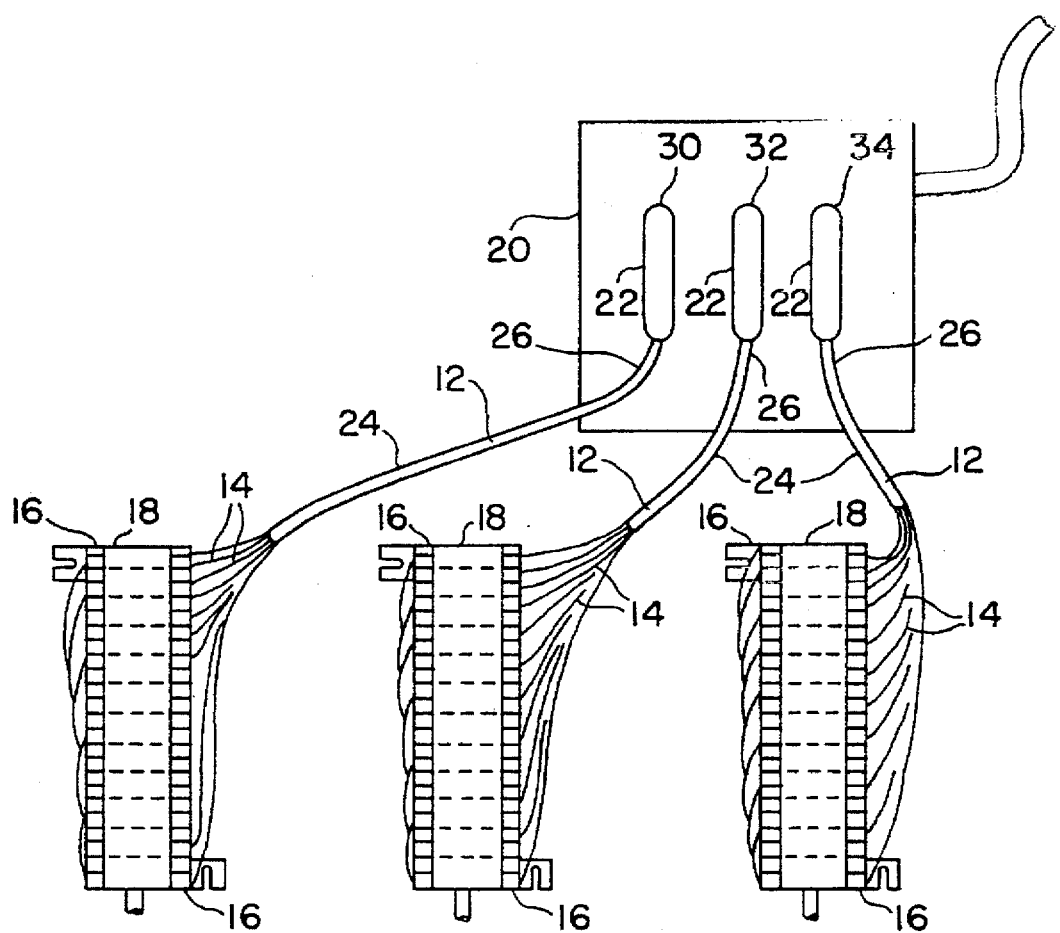
FIG. 2 is a front view of a typical prior art telephone system utilizing the conventional single plug cables and block connections.
Figure 3:
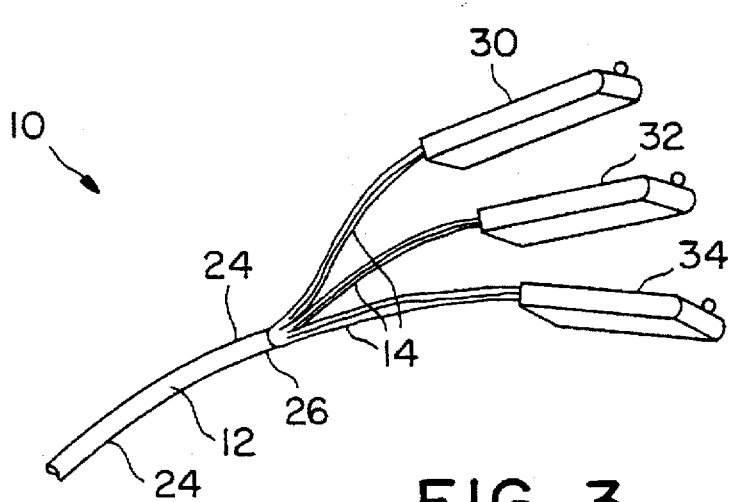
FIG. 3 is a perspective view of the inventive reconfigured cable of the first embodiment for connecting all lines from a generic telephone control box to a block.
Figure 4:
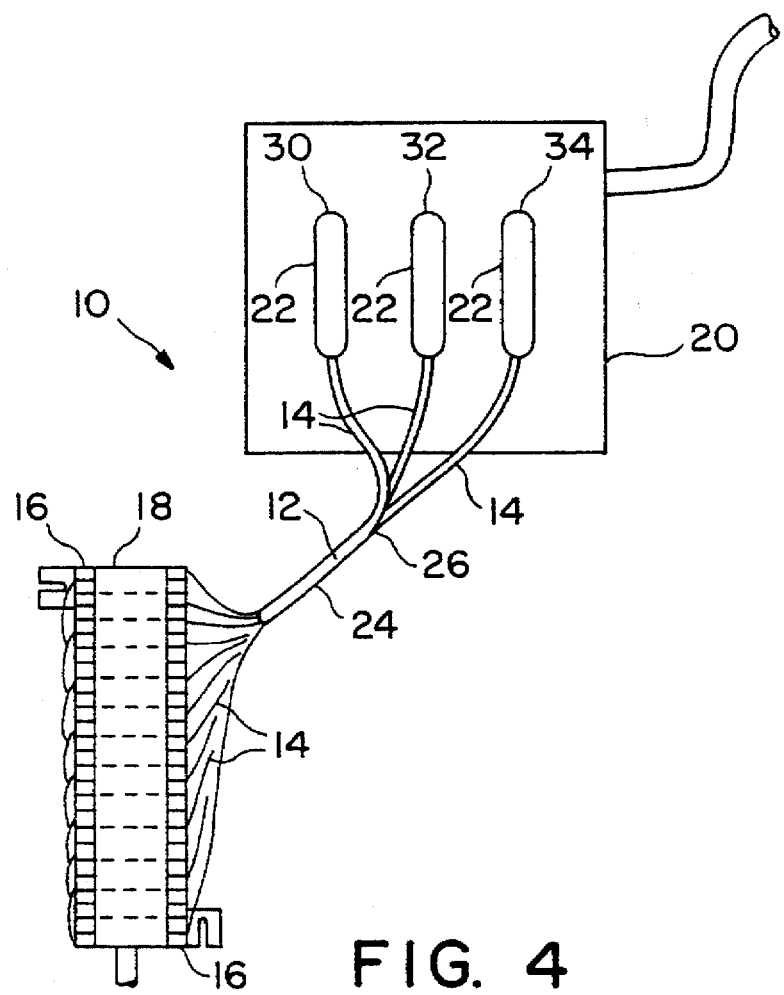
FIG. 4 is a front view of the telephone system of FIG. 2 utilizing the first embodiment reconfigured cable and block connection.
Figure 6:
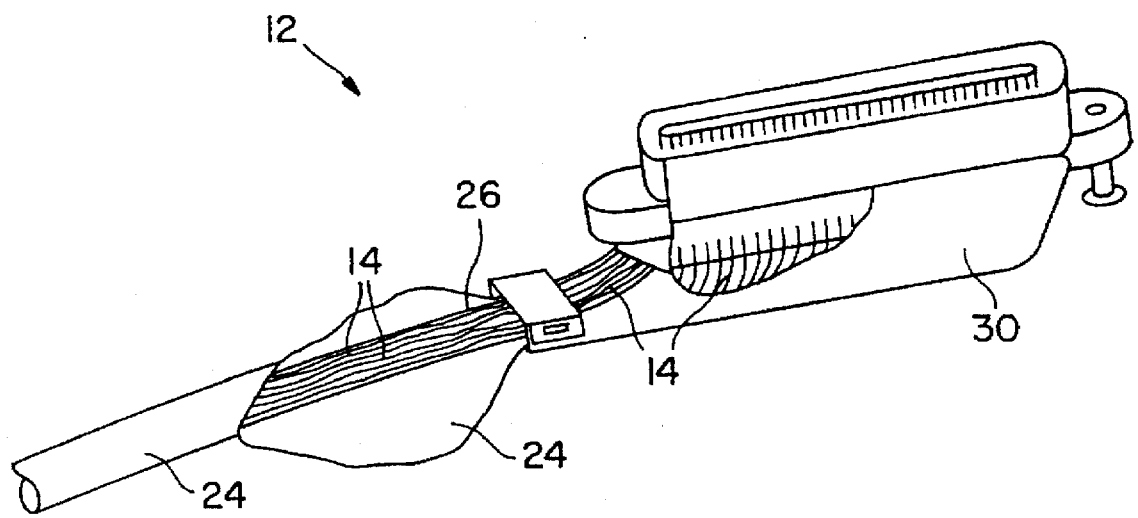
FIG. 6 is a perspective view of a conventional standard cable as in FIG. 1 for connecting a TOSHIBA™ telephone control box to a block.
Figure 7:
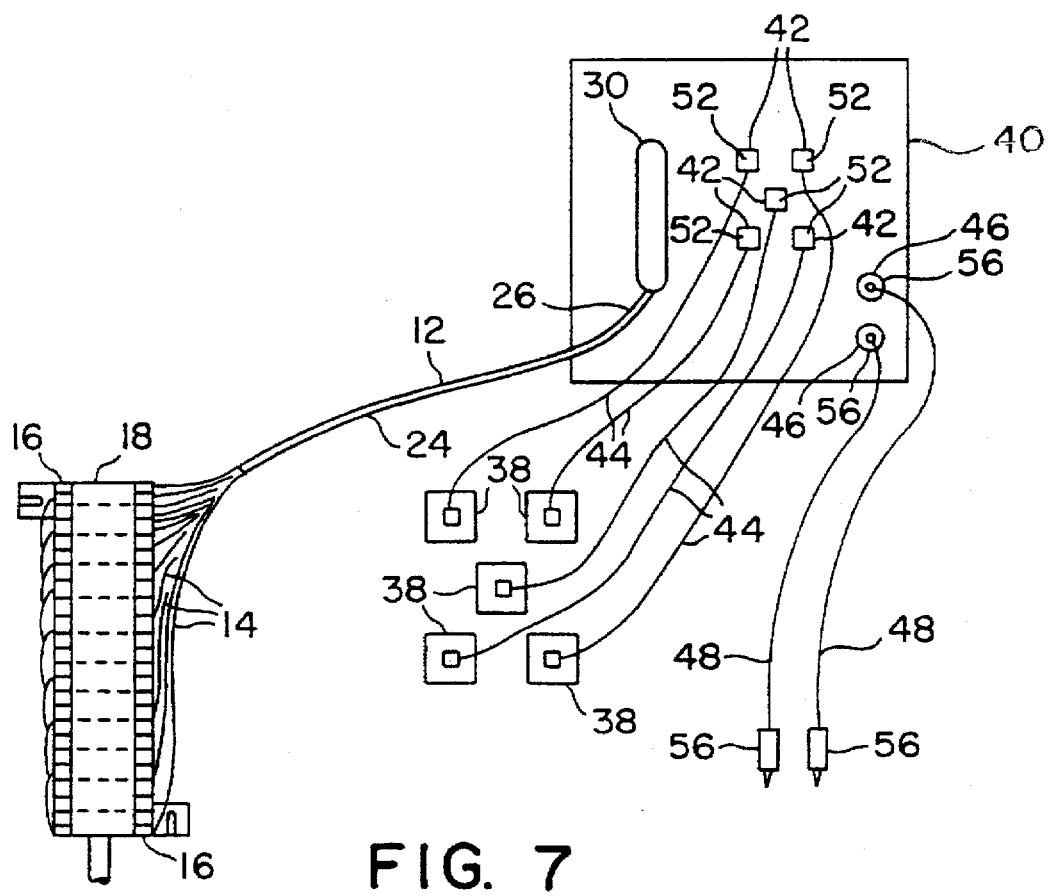
FIG. 7 is a front view of a TOSHIBA™ prior art telephone system utilizing the conventional single plug cables and block connections.
Figure 8:
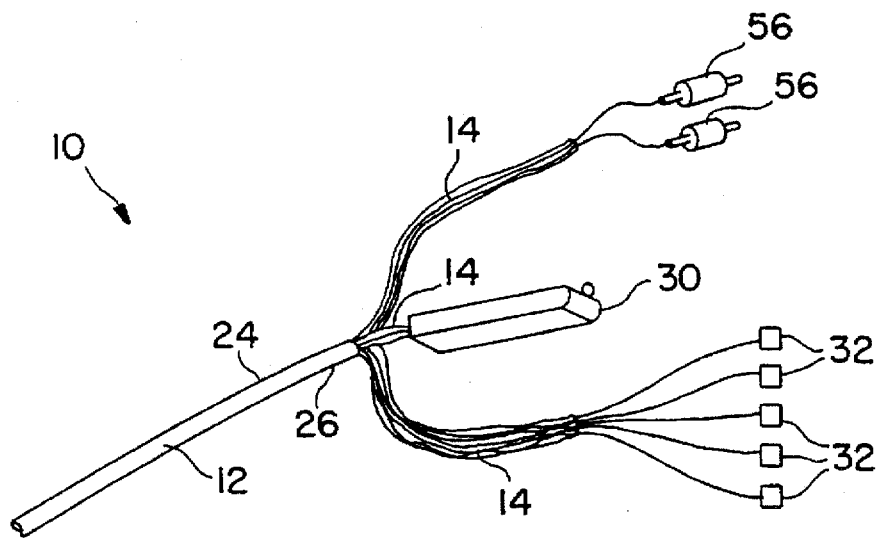
FIG. 8 is a perspective view of the inventive reconfigured cable of the second embodiment for connecting all lines from a TOSHIBA™ telephone control box to a block.
Figure 9:
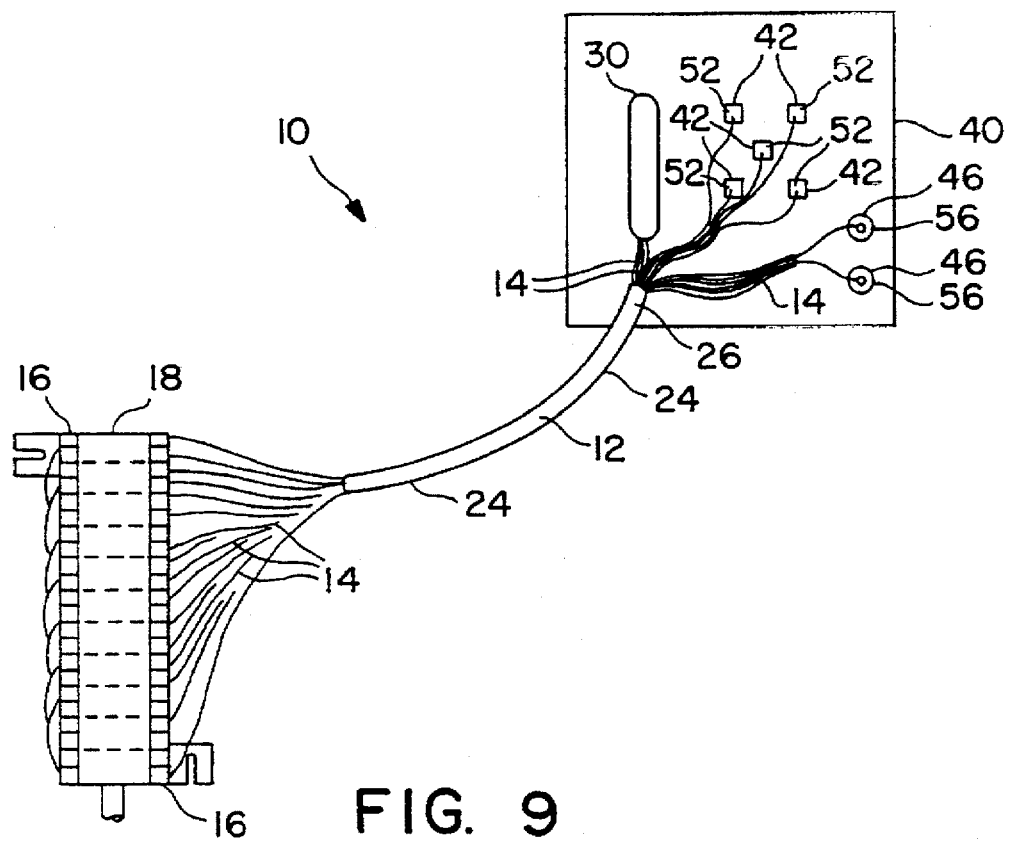
FIG. 9 is a front view of the TOSHIBA™ telephone system of FIG. 7 utilizing the inventive second embodiment reconfigured cable and block connection.

Referring to FIGS. 1–10, a digital telephone cable assembly 10 is disclosed which reconfigures conventional AMP™ tail cables 12 so that almost all lead wires 14 and block terminals 16 are used, and which therefore requires fewer cables 12 and blocks 18. More importantly, installation hours are greatly reduced, because very little time is spent connecting dead wires 14 to blocks 20. An embodiment of the invention is provided for both the generic and the TOSHIBA™ control boxes 20 and 40, respectively.

The first embodiment of the present invention is for use with the generic control box 20 with three AMP™ tail plug receptacles 22.

Method of First Embodiment Cable Reconfiguration

In practicing the invention, the following method may be used. The cable apparatus 10 is created from a standard cable and plug 30. One AMP™ tail plug 30 is already attached. The outer casing 24 of the plug end 26 of the cable 12 is opened. The first eight wire pairs 14 in the color code sequence remain connected to the first plug, and the remaining wire pairs 14 are disconnected. The second eight wire pairs 14 in the code sequence are connected in color code order to terminals 16 of a second AMP™ tail plug 32, and the third eight wire pairs 14 are connected in color code order to terminals 16 of a third AMP™ tail plug 34.

Method of First Embodiment System Assembly

In practicing the invention, the following method may be used. These three plugs 30, 32 and 34 can then be fitted into the three receptacles 22 in the generic control box 20, so that all telephone lines run through the one cable 12.

Twenty four of the twenty five wire pairs 14 in the single cable 12 are thereby used. The wire pairs 14 are connected to terminals 16 of a single block 18, rather than to the first eight terminals 16 of each of three separate blocks 18. Three sets of eight wire pairs 14 are run from the one block 18 to individual telephones, each set being ordered in the color code sequence.

Second Preferred Embodiment

The second embodiment is for use with the TOSHIBA™ control box 40, and is also fashioned from a standard cable 12 and plug 30. For TOSHIBA™ digital systems, only the first eight wire pairs 14 of the cable 12 are used for multi-line digital telephones. The ninth wire pair 14 is unused and the next four wire pairs 14 in the sequence are used for analog single lines such as for home telephones, modems and for telefax machines. Yet, once again, all twenty five wire pairs 14, including the unused thirteen, must be punched down onto the block 18 in code order. The TOSHIBA™ five modular receptacles each provide a separate telephone number. These separate numbers work in conjunction with the first eight separate telephone lines, so that each line can have up to five numbers, as seen on many office telephones. Separate modular plug lines 44 are plugged into the five modular receptacles 42 at one end and into modular jacks at the other end. One TOSHIBA™ speaker plug receptacle 46 is connected with a speaker plug wire 48 to a radio system, which may provide music to lines on hold, or to speakers in the building ceiling. The other speaker plug receptacle 46 may be connected to a paging system.

Method of Second Embodiment Cable Reconfiguration

In practicing the invention, the following method may be used. To make the second embodiment, the outer casing 24 of the plug end 26 of the cable 12, to which the one AMP™ tail plug 30 is already fitted, is opened. The first eight wire pairs 14 in the color code sequence remain connected to the existing plug 30, and the remaining wire pairs are disconnected from the existing plug 30. Five of the remaining wire pairs are each connected to a modular plug 52. Two of the remaining wire pairs 14 are each connected to a speaker plug 56.

Method of Second Embodiment System Assembly

In practicing the invention, the following method may be used. The resulting single cable 12 has one standard plug 30 which is fitted into the TOSHIBA™ cable plug receptacle 22, five modular plugs 52 which are fitted into the five modular receptacles 42, and two speaker plugs 56 which are fitted into the two speaker plug receptacles 46. Rather than being connected to telephone lines through a modular jack 38, the five modular phone number lines connect to the telephone wires through the same block 18 to which the eight line wire pairs 14 are connected. Once again these wires 14 are ordered in the established color code sequence. The two speaker plug wire pairs 48 connect to the radio and paging system through the same block 18. An additional wire pair 14 is connected through block 18 to a relay contact for unlocking a building outer door. This inventive single cable system utilizes nineteen of the twenty five wire pairs 14 in the standard cable 12. It eliminates the need for connecting these wire pairs 14 in addition to installing and connecting five modular phone jacks 38 and two separate speaker plug lines 48.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A reconfigured standard telephone cable assembly for connecting cable plug receptacles on a generic control box to a telephone terminal block, comprising:

a standard telephone cable containing a plurality of lead wires within a cable casing, each said lead wire having a plug end and a block end and a distinctive color code corresponding to an established color code sequence;

a first cable plug and a second cable plug, each said cable plug having connection means for connecting a plurality of lead wires, wherein the first eight of said lead wire plug ends in said cable code sequence are connected to said connection means of said first cable plug, and wherein the second eight of said lead wire plug ends in said cable code sequence are connected to said connection means of said second cable plug.

2. The cable assembly of claim 1, additionally comprising a third cable plug, wherein a third eight of said lead wire plug ends in said color code sequence are connected to said connection means of said third cable plug.

3. A reconfigured standard telephone cable assembly, comprising:

a generic control box having a plurality of cable plug receptacles;

a telephone terminal block;

a standard telephone cable containing a plurality of lead wires within a cable casing, each said lead wire having a plug end and a block end and a distinctive color code corresponding to an established color code sequence;

a first cable plug and a second cable plug, each said cable plug having connection means for connecting a plurality of lead wires, wherein the first eight of said lead wire plug ends in said code sequence are connected to said connection means of said first cable plug, and wherein a second eight of said lead wire plug ends in said code sequence are connected to said connection means of said second cable plug.

4. The cable assembly of claim 3, additionally comprising a third cable plug, wherein a third eight of said lead wire plug ends in said color code sequence are connected to said connection means of said third cable plug.

5. A method of making a reconfigured telephone cable plug assembly, comprising the steps of:

providing a standard telephone cable containing a plurality of lead wires within a cable casing, each said lead wire having a plug end and a block end and a distinctive color code corresponding to an established color code sequence and a first plug having connection means connected to said lead wire plug ends;

opening said cable casing adjacent to said lead wire plug ends;

disconnecting a plurality of said lead wire ends, beginning with the ninth lead wire in the color code sequence;

providing a second cable plug having lead wire connection means;

and connecting the ninth through the sixteenth lead wires in the color code sequence to said connection means of said second cable plug.

6. The method of claim 5, additionally comprising the steps of:

providing a telephone control box having a plurality of cable plug receptacles;

plugging said first cable plug and said second cable plug into said cable plug receptacles;

providing a terminal block having a plurality of terminals;

and connecting said lead wires to terminals on said telephone terminal block in said color code sequence.

* * * * *